(No Model.) 2 Sheets—Sheet 1.
H. HAGGE & W. L. WILLIAMS.
PORTABLE PLATFORM DUMP AND ELEVATOR FOR CRIBBING CORN.
No. 301,588. Patented July 8, 1884.
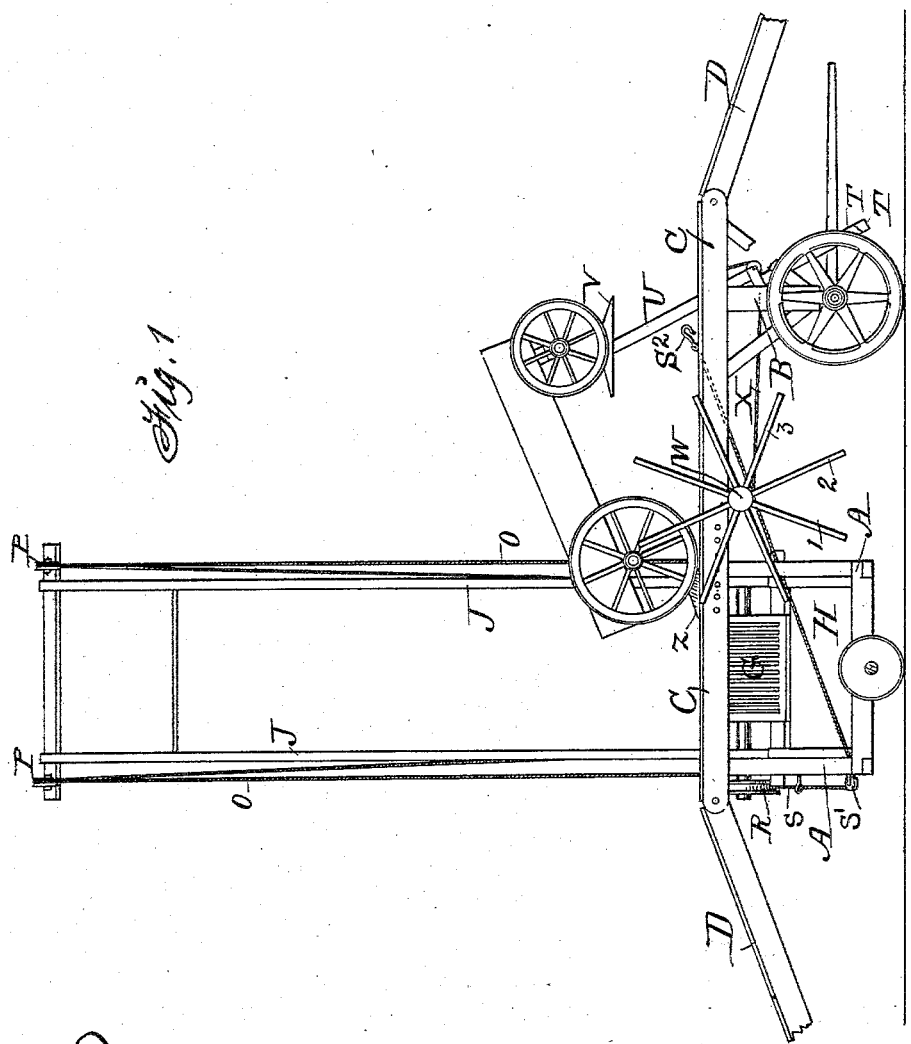

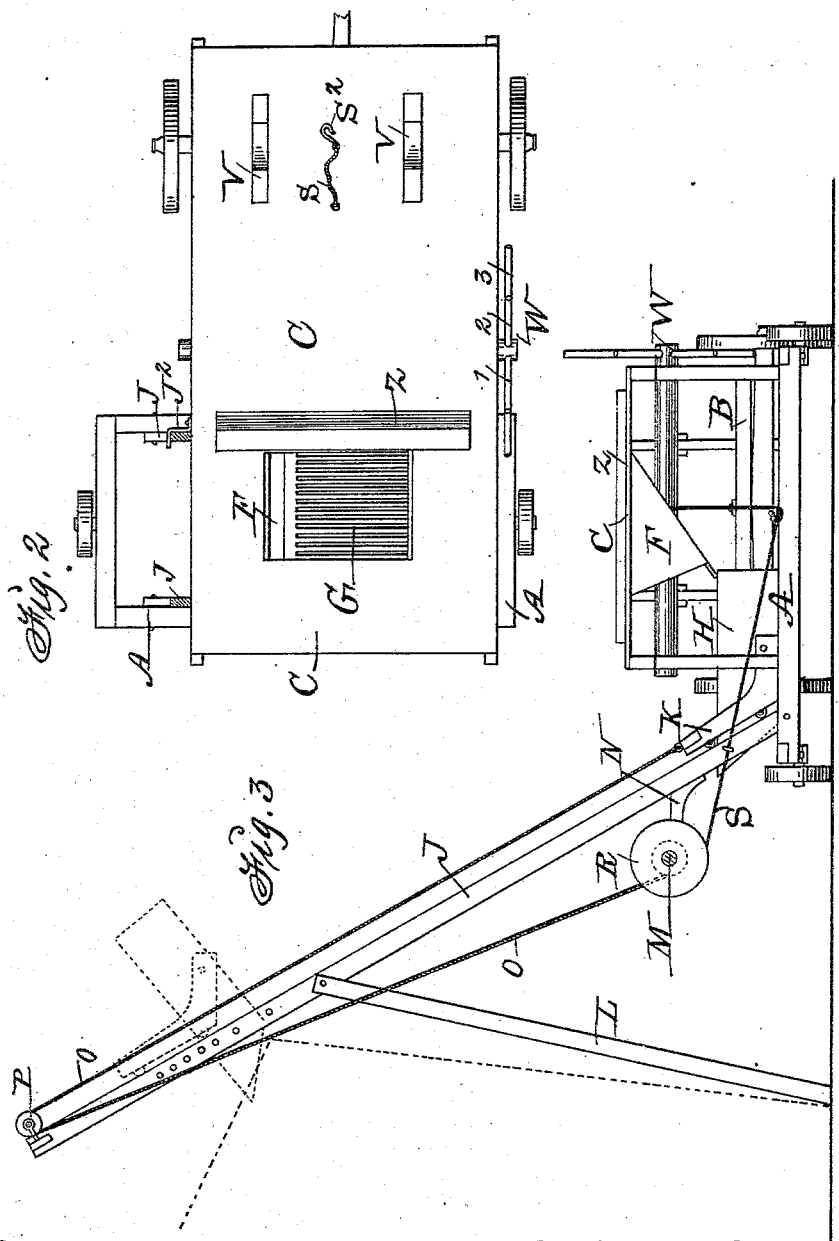

UNITED STATES PATENT OFFICE.

HENRY HAGGE AND WARREN L. WILLIAMS, OF WALNUT, IOWA.

PORTABLE PLATFORM-DUMP AND ELEVATOR FOR CRIBBING CORN.

SPECIFICATION forming part of Letters Patent No. 301,588, dated July 8, 1884.

Application filed April 28, 1884. (No model.)

*To all whom it may concern:*

Be it known that we, HENRY HAGGE and WARREN L. WILLIAMS, of Walnut, in the county of Pottawattamie and State of Iowa, have invented a Portable Platform-Dump and Elevator for Cribbing Corn, &c., of which the following is a specification.

Our object is to save time, labor, and expense in unloading corn and other substances in bulk from wagons and placing the same in cribs, bins, or other receptacles.

Our invention consists in the construction and combination of a portable platform and wagon dump and an adjustable elevator, as hereinafter fully set forth, in such a manner that a loaded wagon can be drawn by horses upon the platform, the front end of the wagon elevated by operating a hand-wheel, to slide the contents of the wagon into an elevator-box, and the loaded box elevated by the advance of the empty wagon, and the contents of the elevated box discharged into a corn-crib.

Figure 1 of the accompanying drawings is a side view of our apparatus. Fig. 2 is a top view of the platform and dump. Fig. 3 is an end view of the apparatus in position aside of a corn-crib that is indicated by dotted lines.

Jointly considered, these figures clearly illustrate the construction, application, operation, and utility of our complete invention.

A represents the frame of a truck or rear carriage. It is oblong in form, and has low wheels attached at its ends and longitudinal center.

B is the front carriage, to which an axle having traction-wheels on its ends is pivoted by means of a king-bolt, or in any suitable way, so as to allow the wheels to be turned relative to the complete carriage, as required to change the line of advance in moving from one position to another.

C represents a platform fixed on top of the rear carriage, A, and the front carriage, B, to serve as a reach in connecting the two, and also to serve as a platform for the reception and dumping of loaded wagons.

D D are bridges detachably connected with the ends of the platform C in such a manner that wagons can pass up at one end and down at the opposite end of the platform.

F is a chute fixed in an opening formed in the central and rear portion of the platform C.

G represents a grate in the inclined bottom of the chute, through which shelled corn will be sifted and separated from the ears that may be dumped from a wagon into the chute.

H represents an elevator-box that is adapted to rest upon the frame A in such a position relative to the chute F that it will receive the corn, coal, or other substance that may descend through the chute.

J J are the side pieces of an elevator-frame, pivoted to the side pieces of the lower portion of the frame A, that extends laterally relative to the top of the same frame and the platform C, as clearly shown in Figs. 2 and 3.

$J^2$ is a hook pivoted to the platform C, to engage the elevator-frame and retain it in a vertical position.

K K are elbow-shaped side pieces of a carriage that is adapted to slide up and down upon the elevator-frame and to carry the elevator-box H, that is pivoted in the lower end of the sliding frame and carriage.

L L are the side pieces of a frame that is pivoted to the upper portion of the elevator-frame J J, to support the same at various inclinations and elevations as required in adjusting it relative to different corn-cribs or other buildings or receptacles.

M is the axle of a winch that is attached to the lower portion and rear side of the elevator-frame by means of brackets or bearings N.

O O are ropes attached to the top end and sides of the carriage K, and passed over pulleys P at the top of the elevator-frame, and from thence down and fastened to drums on the shaft M.

R is a drum-wheel fixed on the end of the shaft M.

S is a rope fixed to the drum R, and from thence passed over a directing-pulley, S', and then forward under the platform C and up through a perforation in the center of the platform.

S' is a hook fixed to the end of the rope, for connecting the rope detachably with a wagon on the platform C.

T T are tracks fixed under the platform C, in an inclined position, to support a sliding frame, U.

Z are shoes fixed to the top of the sliding frame U, to receive and carry the front wheels of a loaded wagon that is placed upon the platform.

W represents a winch attached under the central portion of the platform. Nos. 1 2 3 represent the spokes of a wheel fixed to the end of the axle of the winch in such a manner that a person on the ground at the side of the platform can readily operate the wheel and winch to wind up and shorten ropes X, that extend from the winch W over pulleys Y at the lower end and corners of the frame V to the under side of the platform, where they are fastened. As the ropes X are thus shortened the sliding frame U upon the fixed tracks T will be elevated to raise the front end of a wagon, as illustrated in Fig. 1.

Z represents a fixed or adjustable chock on the platform, that prevents the rear wheels of the wagon from moving while the front wheels are elevated, as required, to retain the wagon in a proper position relative to the chute F, into which the contents of the wagon are to be dumped.

By means of perforations in the side pieces of the platform C and a movable pin that can be inserted in the perforations, so that it will project and engage one of the series of spokes 1 2 3, the winch W can be readily locked and the front end of the wagon retained elevated until its contents have been discharged. A common ratchet and pawl may be substituted for the movable pin and perforations. When a load of corn is thus emptied from a wagon and dumped through the chute into the elevator-box H, we simply attach the hook S″ on the end of the rope S to the wagon, and then advance the wagon (after its front end is lowered) and move it from the platform, and by so doing operate the winch R and elevate the loaded box H upon the inclined elevator-frame, and as the end of the box H comes in contact with an adjustable bar, No. 4, it will be automatically lifted and emptied.

From the foregoing description of the construction and function of each element and sub-combination of our apparatus, their unitary actions and the practical operation of our complete invention are obvious.

We claim as our invention—

1. The combination of a portable platform, A B C D, having a chute, F, an adjustable elevator-frame, J J, a sliding frame or carriage, K, a box, H, pivoted to the sliding elevator-carriage, and a winch and cords and pulleys for raising and lowering the carriage K and box H, for the purposes specified.

2. The fixed tracks T T, the sliding frame U, carrying shoes V at its top, the winch W, the ropes X, and the pulleys Y, in combination with an elevated platform, to operate in the manner set forth, for the purposes specified.

3. The apparatus for unloading wagons and elevating corn into cribs, &c., composed of the following elements, to wit: a portable platform, A B C D, having a chute, E, an adjustable elevator-box, H, an adjustable elevator-frame, J J, a sliding elevator-carriage, K, a winch, M N R, a rope, S, fixed racks T T, a sliding frame, U, carrying shoes V, a winch, W, and ropes X, substantially as shown and described, to operate in the manner set forth.

HENRY HAGGE.
WARREN L. WILLIAMS.

Witnesses:
O. M. BRUCE,
CHAS. F. DARNALL.